United States Patent
Begenau et al.

(10) Patent No.: US 9,216,627 B2
(45) Date of Patent: Dec. 22, 2015

(54) TORSION BEAM FOR AN ANTI-ROLL BAR OF A MOTOR VEHICLE

(71) Applicant: Dr. Ing. h.c. F. Porsche Aktiengesellschaft, Stuttgart (DE)

(72) Inventors: Eric Begenau, Stuttgart (DE); Boris Schmidt, Karlsruhe (DE); Gustav Rapp, Murr (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 14/521,780

(22) Filed: Oct. 23, 2014

(65) Prior Publication Data

US 2015/0115559 A1    Apr. 30, 2015

(30) Foreign Application Priority Data

Oct. 24, 2013   (DE) .......................... 10 2013 111 700

(51) Int. Cl.
*B60G 21/055*   (2006.01)
*B60G 9/00*   (2006.01)

(52) U.S. Cl.
CPC ............... *B60G 21/055* (2013.01); *B60G 9/003* (2013.01); *B60G 21/0551* (2013.01); *B60G 2202/135* (2013.01); *B60G 2204/1222* (2013.01); *B60G 2204/418* (2013.01); *B60G 2206/427* (2013.01); *B60G 2206/7101* (2013.01)

(58) Field of Classification Search
CPC .. B60G 21/055; B60G 9/003; B60G 21/0551; B60G 2202/135; B60G 2204/418; B60G 2206/427; B60G 2204/1222; B60G 2206/7101
See application file for complete search history.

(56) References Cited

U.S. PATENT DOCUMENTS

| 7,044,458 | B2 | 5/2006 | Daily | |
| 2002/0180173 | A1* | 12/2002 | Daily et al. | ............ 280/124.166 |
| 2011/0001350 | A1* | 1/2011 | Schmitz et al. | ............ 301/124.1 |
| 2011/0227402 | A1* | 9/2011 | Wibbeke et al. | ............ 301/124.1 |
| 2014/0027995 | A1* | 1/2014 | Kuroda | ................... 280/124.152 |

FOREIGN PATENT DOCUMENTS

| DE | 3910641 | 10/1990 |
| DE | 60222494 | 6/2008 |
| DE | 102010049563 | 4/2012 |

OTHER PUBLICATIONS

German Search Report mailed Mar. 31, 2014, for corresponding German Patent Application No. 10 2013 111 700.7, with partial English translation.

* cited by examiner

*Primary Examiner* — Drew Brown
(74) *Attorney, Agent, or Firm* — RatnerPrestia

(57) ABSTRACT

A torsion beam for an anti-roll bar of a motor vehicle is provided having a main body which is produced from a carbon fiber material, and at least one non-metallic bearing layer which is applied on the main body in order to form one sliding bearing side of an anti-roll bar bearing. As a result of the protection of the main body provided by the bearing layer against abrasive wear in the anti-roll bar bearing, the main body can be produced from the carbon fiber material, with the result that a lightweight and durable anti-roll bar for driving stability of a motor vehicle is made possible.

9 Claims, 1 Drawing Sheet

TORSION BEAM FOR AN ANTI-ROLL BAR OF A MOTOR VEHICLE

CROSS-REFERENCE TO RELATED APPLICATIONS

This application claims priority under 35 U.S.C. §119 of German Patent Application No. 2013 111 700.7, filed Oct. 24, 2013, which is incorporated by reference herein in its entirety.

FIELD OF THE INVENTION

The invention relates to a torsion beam which can be used as a spring element which is loaded torsionally as an anti-roll bar tube of an anti-roll bar of a motor vehicle, in order, for example, to counteract rolling of a motor vehicle when driving around bends.

BACKGROUND OF THE INVENTION

Anti-roll bar tubes for anti-roll bars are used in automotive technology to reduce the tilting of the vehicle body in bends and to influence the self-steering effect, for example to reduce oversteer. As a result, in the case of loading on one side, for example when driving over obstacles on one side or when driving around bends, a spring of a wheel suspension system can be stiffened, in order to counteract rolling of the motor vehicle. To this end, the anti-roll bar tube is configured as a torsion beam which is mounted in the motor vehicle transversely with respect to the driving direction and acts on the wheel suspension systems via in each case one lever. If, for example, the motor vehicle tilts to the side when driving around bends as a consequence of centrifugal forces which act, the wheel on the inside of the bend is compressed to a more pronounced extent than the outer wheel. As a result, the anti-roll bar tube of the anti-roll bar is twisted elastically and, by way of its spring force against torsion, counteracts tilting to the side.

DE 39 10 641 A1, which is incorporated by reference herein, has disclosed a torsion beam which is produced from a fiber-reinforced plastic as anti-roll bar tube of an anti-roll bar for a motor vehicle, the fiber-reinforced plastic of the torsion beam being provided in thickened state with a greater diameter in the region of bearing points.

There is a constant requirement to configure anti-roll bars for driving stability of a motor vehicle to be lightweight and durable.

SUMMARY OF THE INVENTION

Described herein is a lightweight and durable anti-roll bar for driving stability of a motor vehicle.

According to aspects of the invention, a torsion beam for an anti-roll bar of a motor vehicle is provided having a main body which is produced from a fiber composite component, and at least one non-metallic bearing layer which is applied on the main body in order to form one sliding bearing side of an anti-roll bar bearing. Here, the main body is preferably produced from a carbon fiber material.

A highly weight-specific strength and stiffness against torsion can be achieved with a lower overall weight by way of the carbon fiber material, in particular carbon fiber reinforced plastic ("CRP"), of the main body. Damage of the main body, in particular in the region of bearing points, can be avoided by way of the non-metallic bearing layer which is different than the carbon fiber material of the main body. As a result of the non-metallic material, the bearing layer can be of sufficiently soft configuration, with the result that the material of the bearing layer is not pressed into main bodies and does not damage the carbon fibers. The main body can be protected by the bearing layer against, for example, abrasive damage by way of an anti-roll bar bearing, with the result that, in particular, penetration of moisture and electrochemical corrosion of the main body can be avoided. In particular, the material selection of the bearing layer can be optimized for this purpose and can be carried out substantially independently of the spring characteristic, to be provided, of the torsion beam. In comparison to a torsion beam made from a glass fiber reinforced plastic or metal, the torsion beam is additionally considerably lighter against torsion with a comparable stiffness and spring characteristic. As a result of the protection of the main body against abrasive wear in the anti-roll bar bearing, which protection is provided by way of the bearing layer, the main body can be produced from the carbon fiber material, with the result that a lightweight and durable anti-roll bar for driving stability of a motor vehicle is made possible.

In particular, the torsion beam can be mounted by two or more anti-roll bar bearings, with the result that a correspondingly large number of bearing layers which are spaced apart from one another can be provided, it being possible for the plurality of bearing layers to be produced, in particular, from the same non-metallic material. The respective bearing layers can be of substantially identical configuration. The torsion beam can be of symmetrical configuration, in particular, with respect to a center point. The main body is preferably of tubular configuration, for example as a hollow cylinder, it being possible for the main body to have, in particular, an angled course in the axial direction, for example in order for it to be possible to integrate it in an improved manner into an existing installation space on the underside of the motor vehicle. In the mounted state, the bearing layer can form one of the sliding bearing sides of the anti-roll bar bearing, which sliding bearing side can slide on another sliding bearing side of the anti-roll bar bearing. The bearing layer can form the shaft-side sliding bearing side, whereas the hub-side sliding bearing side can be formed by a rubber body of the anti-roll bar bearing. A contact-making and wear-inducing relative movement with the anti-roll bar bearing can take place on the bearing layer of the torsion beam.

In particular, the bearing layer is produced from glass fibers. The bearing layer can be composed, in particular, of a glass fiber reinforced plastic ("GRP"). As a result, the bearing layer can be fastened readily to the main body which is produced from the carbon fiber material. In particular, the risk is reduced that the bearing layer detaches from the main body in the case of torsional loads of the main body. The alignment of the glass fibers can be oriented, in particular, with respect to the texture of the carbon fibers of the main body, which results in a substantially identical texture for the bearing layer. In particular, the glass fibers can be wound multiple times around the main body or can be applied in a plurality of layers which lie one above another, with the result that inner windings of the glass fibers which can still protect the carbon fiber material of the main body remain in the case of abrasive wear of the bearing layer.

The bearing layer is preferably configured as a sacrificial layer for abrasive wear in the anti-roll bar bearing. In particular, it is provided that, instead of the main body, exclusively only the bearing layer is impaired as a result of abrasive wear at the bearing point by way of the anti-roll bar bearing. The functionality of the main body, in particular the spring characteristic of the main body in the case of torsion, remains substantially constant over the service life. To this end, a sufficiently great layer thickness, in particular, which is selected depending on the desired service life and the abrasive wear to be expected over the service life is provided for the bearing layer.

The bearing layer is particularly preferably produced by braiding and/or laminating of the main body. As a result, the bearing layer can follow the elastic deformations of the main body in the case of torsional loads more readily without detaching. In particular, the bearing layer can be applied to the main body, preferably in a common production step, when the carbon fiber material is not yet hardened, with the result that an identical resin can be used, for example, for the main body and the bearing layer.

In particular, an adhesive layer for fastening a lever is applied on the main body in the axial direction laterally next to the bearing layer. The adhesive layer can directly adjoin the bearing layer laterally or can be spaced apart in the axial direction from the bearing layer. The adhesive layer can be provided, in particular, in the immediate vicinity of the bearing layer, with the result that the lever can be positioned so as to be adjacent to the anti-roll bar bearing or so as to make contact with the anti-roll bar bearing. In particular, the adhesive layer can be applied to the main body after the production of the bearing layer, with the result that the bearing layer can be used for the correct positioning of the adhesive layer. The mounting of the lever is simplified and accelerated as a result.

The adhesive layer preferably has a greater outer diameter than the bearing layer. It can be ensured in this way that the lever does not come into contact with the bearing layer and damage the bearing layer. A sleeve of the lever which is connected to the adhesive layer is always spaced apart radially from the bearing layer.

Furthermore, the invention relates to an anti-roll bar for driving stability of a motor vehicle having a torsion beam which can be configured and developed as described above, at least one lever which is connected to the torsion beam for attaching the torsion beam to a wheel suspension system, and an anti-roll bar bearing which acts on the bearing layer of the torsion beam. The anti-roll bar can be configured and developed, in particular, as has been explained using the torsion beam. As a result of the protection of the main body of the torsion beam against abrasive wear in the anti-roll bar bearing, which protection is provided by way of the bearing layer, the main body can be produced from the carbon fiber material, with the result that a lightweight and durable anti-roll bar for driving stability of a motor vehicle is made possible.

In particular, the lever protrudes in the axial direction beyond a part of the bearing layer, in particular spaced apart in the radial direction from the bearing layer. As a result, an edge region of the bearing layer can be positioned radially within the lever, as a result of which the anti-roll bar bearing cannot make contact with that region of the bearing layer which is covered by the lever. Disruptive boundary effects, for example fiber ends of the glass fibers of the bearing layer which protrude as a result of fiber pull-out, are avoided. The abrasive wear of the bearing layer of the torsion beam is kept low as a result.

The lever preferably has an axial stop for striking axially against the anti-roll bar bearing. The axial positioning of the torsion beam within the anti-roll bar can be predefined very precisely by way of the axial stop of the at least one lever, preferably by way of in each case one axial stop of two different levers, as a result of which the mounting is simplified.

The anti-roll bar bearing particularly preferably has a rubber body which makes contact with the bearing layer of the torsion beam and is made from an elastomeric material. The elastomeric material of the anti-roll bar bearing can readily follow a change in diameter of the torsion beam in the case of torsional loads, with the result that a gap between the bearing layer of the torsion beam and the rubber body of the anti-roll bar bearing during operation is avoided. In particular, rattling noises can be avoided and/or forces in the radial direction can be damped.

In particular, the anti-roll bar bearing can be composed from two shells which can be assembled in the radial direction and can be connected to one another by way of fastening means, in particular screws.

BRIEF DESCRIPTION OF THE DRAWINGS

In the following text, the invention will be explained by way of example with reference to the appended drawings using preferred exemplary embodiments, it being possible for the features which are shown in the following text to represent one aspect of the invention both in each case individually and in combination. In the drawings.

DETAILED DESCRIPTION OF THE INVENTION

Figure 1:
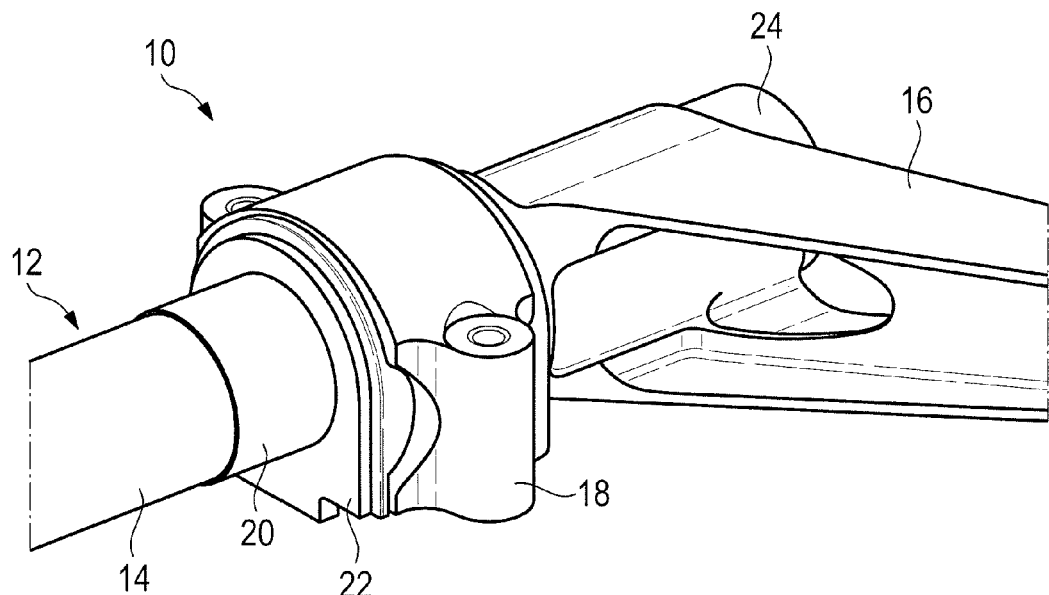
FIG. 1 shows a diagrammatic perspective view of a part of an anti-roll bar.

The anti-roll bar 10 which is shown in FIG. 1 has a torsion beam 12 with a tubular main body 14, to which a lever 16 which is made from aluminum is connected fixedly so as to rotate with it. The lever 16 can be connected to a wheel suspension system of a motor vehicle on the side which is shown in FIG. 1. The torsion beam 12 is mounted in an anti-roll bar bearing 18 which can be connected to a motor vehicle body. To this end, a bearing layer 20 which is produced from GRP is provided on the outer side of the main body 14 which is produced from a fiber composite component such as CRP, which bearing layer 20 is in contact with a rubber body 22 of the anti-roll bar bearing 18, which rubber body 22 is produced from a rubber material. Together with the rubber body 22, the anti-roll bar bearing 18 is divided into two shells which can be screwed to one another. The opposite side of the anti-roll bar 10 can be of corresponding, in particular symmetrical, configuration, with the result that the anti-roll bar 10 has in each case one lever 16 and one anti-roll bar bearing 18 at two ends.

Figure 2:
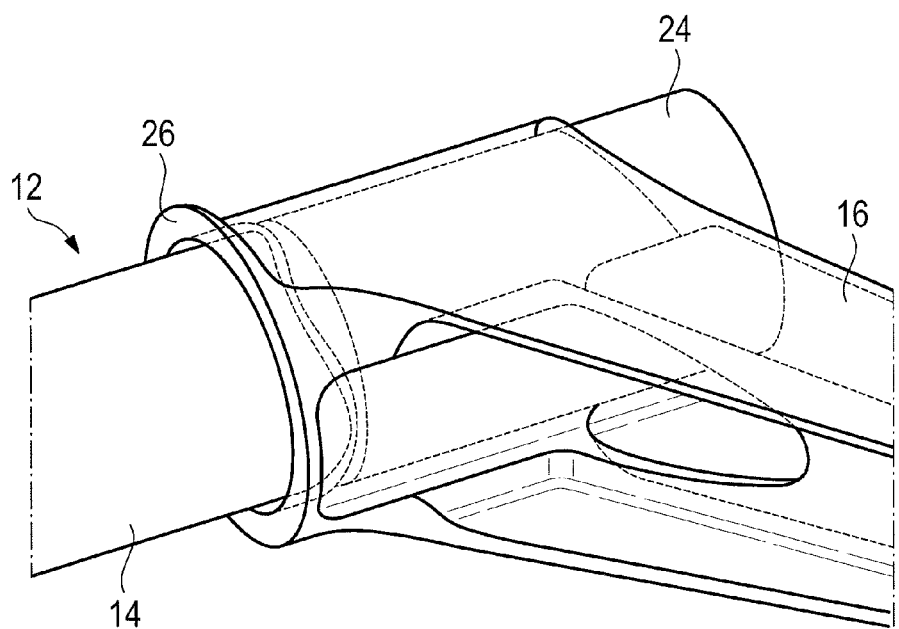
FIG. 2 shows a diagrammatic perspective view of a torsion beam of the anti-roll bar from FIG. 1.

As shown in FIG. 2, the lever 16 (shown in transparent form) is fastened to the main body 14 via an adhesive layer 24 which is provided in the axial direction next to the bearing layer 20. The lever 16 protrudes somewhat beyond the bearing layer 20 in the axial direction, with the result that the rubber body 22 of the anti-roll bar bearing 18 does not act on the edge, but rather substantially centrally on the bearing layer 20 of the torsion beam 12. To this end, the lever 16 has an axial stop 26 which points toward the anti-roll bar bearing 18 and can strike against the anti-roll bar bearing 18. The axial stop 26 can be formed, for example, by way of a radially outwardly projecting collar on the lever 16.

What is claimed is:

1. A torsion beam for an anti-roll bar of a motor vehicle, having a main body which is produced from a fiber composite component, and at least one non-metallic bearing layer which is applied on the main body in order to form one sliding bearing side of an anti-roll bar bearing, wherein the anti-roll bar bearing has a rubber body which makes sliding contact with the bearing layer of the torsion beam and is made from an elastomeric material.

2. The torsion beam as claimed in claim 1, wherein the main body is produced from a carbon fiber material and the bearing layer is produced from glass fibers.

3. The torsion beam as claimed in claim 1, wherein the bearing layer is configured as a sacrificial layer for abrasive wear in the anti-roll bar bearing.

4. The torsion beam as claimed in claim 1, wherein the bearing layer is produced by braiding and/or laminating of the main body.

5. The torsion beam as claimed in claim 1, wherein an adhesive layer for fastening a lever is applied on the main body in the axial direction laterally next to the bearing layer.

6. The torsion beam as claimed in claim 5, wherein the adhesive layer has a greater outer diameter than the bearing layer.

7. An anti-roll bar for driving stability of a motor vehicle having the torsion beam as claimed in claim 1, at least one lever which is connected to the torsion beam for attaching the torsion beam to a wheel suspension system, and the anti-roll bar bearing which acts on the bearing layer of the torsion beam.

8. The anti-roll bar as claimed in claim 7, wherein the lever protrudes in the axial direction beyond a part of the bearing layer, and is spaced apart in the radial direction from the bearing layer.

9. The anti-roll bar as claimed in claim 7, wherein the lever has an axial stop for striking axially against the anti-roll bar bearing.

\* \* \* \* \*